Jan. 30, 1951     H. HANSEN     2,539,904

CEMENT WOOL BUILDING MATERIAL

Filed Nov. 15, 1947

INVENTOR.
HAROLD HANSEN
BY
H. G. Manning
ATTY.

Patented Jan. 30, 1951

2,539,904

UNITED STATES PATENT OFFICE 2,539,904

CEMENT WOOL BUILDING MATERIAL

Harold Hansen, Stafford Springs, Conn.

Application November 15, 1947, Serial No. 786,200

1 Claim. (Cl. 106—93)

This invention relates to building construction, and more particularly to a cement wool building material made by combining wood shavings, Portland cement, water, calcium chloride, and calcium sulfate, as a substitute for the more expensive building materials for use in constructing houses, garages, barns, theaters. etc.

One object of the present invention is to provide a cement wool material in sheet form of the above nature which will be strong, soundproof, insulating, light in weight, water-repellent, non-swelling, fireproof, unaffected by cold and heat, easily nailed, rough-surfaced, and well adapted for application of plaster, concrete or stucco coatings on the surface thereof.

A further object is to provide a cement wool of the above nature which will be simple in construction, inexpensive to manufacture, easy to install and manipulate, compact, ornamental in appearance, and very efficient and durable in use.

With these and other objects in view, there have been illustrated on the accompanying drawing, several forms in which the invention may conveniently be embodied in practice.

Figure 1:
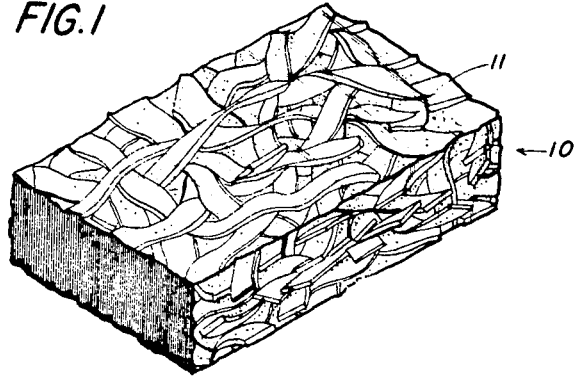
Fig. 1 is a perspective view of a portion of a cement wool building sheet embodying the present invention.

In carrying out the present invention, the sheet of improved cement wool building material is constructed by means of the following process:

4.5 kilograms of wood shavings, preferably of soft wood such as Norway pine or spruce, and approximately 40 to 50 centimeters in length, .015 of an inch in thickness, and ⅛ of an inch wide, will be mixed with 9.5 kilograms of Portland cement, 4 kilograms of water, 50 grams of calcium chloride, and 50 grams of calcium sulfate, the latter two ingredients serving to bind the cement to the shavings. The proportions by weight of the ingredients of the cement wool building material will then be as follows: 24.9% interlaced soft wood shavings, 52.5% Portland cement, 22% water, .05% calcium chloride, .05% calcium sulphate.

To combine these materials, the shavings are first mixed with the calcium chloride, calcium sulfate and the water in a tub or other suitable container for about five minutes until thoroughly wet.

The preliminary mixing of the shavings with the building materials may be done with a rotary mixer, or by hand. The mixture will then be taken out of the tub and laid on a tray or bench at an angle of about 25 degrees to drain for a short time, and then placed in another container or tray. Dry Portland cement will then be shaken upon the mixture and thoroughly commingled therewith. This operation will be repeated two or three times, after which the material will be placed on greased or oiled forms, of any desired size, and pressed into sheets of any desired thickness in a manually operated thumb-screw press, exerting about 150 pounds per square foot, or by a power press, to produce the desired density of the sheet.

The product will be left in the forms from one and one-half to three days to allow the cement to set. The sheet will then be placed on open racks to dry, all edges and ends being cut square by the use of guides. The cement wool sheets will then be ready for use.

The cement wool building material made according to the present invention has been found to be much cheaper than cinder blocks or cement blocks or plasterboard sheets, and may be used as an inexpensive substitute therefor in building construction.

Referring now to the drawing in which like reference numerals denote corresponding parts throughout the several views, the numeral 10 indicates a portion of a completed cement wool sheet, upon the exterior of which the flat shavings 11 are clearly visible.

Figure 2:
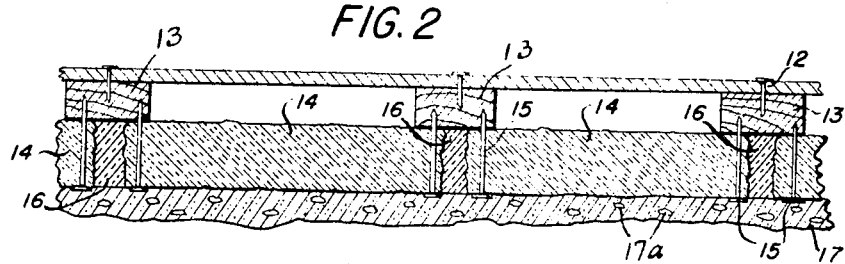
Fig. 2 is a cross-sectional view of an exterior building wall made up of wooden studs, interior plaster board, the improved cement wool, glass wool expansion joints, and an exterior coating of stucco with a netting embedded therein.

Referring now to the first use which may be made of the improved cement wool sheet, the numeral 12 (Fig. 2) indicates a plasterboard sheet, secured as by nails to vertical studs 13, spaced apart in the usual manner. The studs 13 are secured to a plurality of the improved cement wool sheets 14, by means of nails, 15, and between the sheets 14, vertical glass wool expansion strips 16 are preferably inserted. The sheets 14 are arranged end to end as shown, and have a surface 17 of stucco reinforced by a wire netting 17a, applied to the exterior thereof whereby a strong, waterproof, durable, composite building wall construction will be produced.

Figure 3:
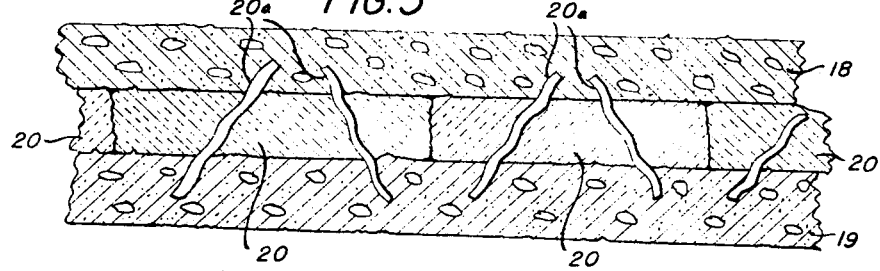
Fig. 3 is a cross-sectional view of a composite reinforced building wall having the improved cement wool sheets located between two exterior layers of concrete.

In the form of the invention shown in Fig. 3, a pair of outer concrete walls 18 and 19 are provided on either side of a plurality of sheets 20 of cement wool which are placed end to end as shown. If desired, a plurality of irregular-shaped wires 20a may be embedded in the sheets 20 and have their ends extending into the concrete walls 18 and 19 for securely reinforcing the composite wall unit.

Figure 4:
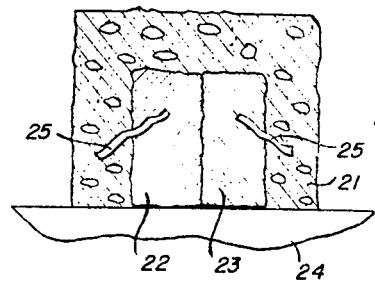
Fig. 4 is a cross-sectional view of a portion of a building footing in which two interior sheets of the improved cement wool are covered by a U-shaped wall of concrete.

In the form of the invention shown in Fig. 4, a building footing is provided having a U-shaped outer casing 21 of concrete which covers a plurality of cement wool sheets 22 and 23, arranged face to face, and located upon the ground or foundation 24. As in Fig. 3, a plurality of irregular wires 25 pass through the sheets 22 and 23 and may be embedded in the outer concrete casing 21 to reinforce it.

While there has been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

A building material consisting of a strong stiff structure having sound-proof, heat-insulating properties, capable of being nailed to a building, and having a rough exterior surface for receiving a coating of stucco or cement, said material comprising a set mixture of substantially the following ingredients, proportioned by weight: 24.9% interlaced thin, substantailly flat elongated soft wood shavings, 52.5% Portland cement, with 22% water; and a binder consisting of .05% calcium chloride and .05% calcium sulphate; said structure also having reinforcing wires embedded therein.

HAROLD HANSEN.

REFERENCES CITED

The following references are of record in the file of this patent:

UNITED STATES PATENTS

| Number | Name | Date |
| --- | --- | --- |
| 1,040,321 | Henderson | Oct. 8, 1912 |
| 1,407,608 | Wawrzymak | Feb. 21, 1922 |
| 1,537,406 | Garrow | May 12, 1925 |
| 1,618,512 | Christiansen | Feb. 22, 1927 |
| 1,702,776 | Hazen et al. | Feb. 19, 1929 |
| 2,063,309 | Graef | Dec. 8, 1936 |
| 2,110,053 | Phillips | Mar. 1, 1938 |